(12) United States Patent  
Dane et al.

(10) Patent No.: US 7,789,723 B2  
(45) Date of Patent: Sep. 7, 2010

(54) UNMANNED OCEAN VEHICLE

(75) Inventors: Robert A. Dane, Sydney (AU); Edward Payne Kilbourn, King George, VA (US)

(73) Assignee: Solar Sailor Pty Ltd (AU)

( * ) Notice: Subject to any disclaimer, the term of this patent is extended or adjusted under 35 U.S.C. 154(b) by 489 days.

(21) Appl. No.: 10/565,449

(22) PCT Filed: Jul. 30, 2004

(86) PCT No.: PCT/AU2004/001014

§ 371 (c)(1),
(2), (4) Date: Aug. 1, 2006

(87) PCT Pub. No.: WO2005/012079

PCT Pub. Date: Feb. 10, 2005

(65) Prior Publication Data

US 2007/0051292 A1    Mar. 8, 2007

(30) Foreign Application Priority Data

Jul. 31, 2003   (AU) .............................. 2003903968
Apr. 21, 2004   (AU) .............................. 2004902116

(51) Int. Cl.
- B63G 8/00 (2006.01)
- B63G 8/08 (2006.01)
- B63G 8/22 (2006.01)
- B63H 9/00 (2006.01)
- B63H 19/00 (2006.01)
- B63H 21/17 (2006.01)
- B63H 23/00 (2006.01)
- B63H 23/24 (2006.01)
- B60L 8/00 (2006.01)
- B60L 11/00 (2006.01)

(52) U.S. Cl. ........................ 440/6; 114/39.21; 114/312; 114/333; 114/337

(58) Field of Classification Search .............. 114/39.11, 114/39.21, 39.29–39.31, 56.1, 312–342; 73/170.16, 170.17, 170.29–170.34; 340/850–852, 340/539.26–539.29, 301, 602; 702/3, 4; 342/26 R, 26 C; 440/6, 8, 9

See application file for complete search history.

(56) References Cited

U.S. PATENT DOCUMENTS 4,102,291 A * 7/1978 Sebald ...................... 114/244

(Continued)

FOREIGN PATENT DOCUMENTS

CA          1049856 A         3/1979

(Continued)

OTHER PUBLICATIONS

Promotional brochure, Hybrid Marine Power Solar Sailor, 2003.

(Continued)

*Primary Examiner*—Ajay Vasudeva  
(74) *Attorney, Agent, or Firm*—Thomas, Karceski, Raring & Teague, P.C.

(57) ABSTRACT

An unmanned, autonomous, waterborne vehicle (500) for marine use capable of operating on and below the surface of water, said vehicle (500) including an enclosed hull (501) having a payload bay (506), a hybrid propulsion system having energy collection means (504) in the form of a wing sail (503) covered with photovoltaic cells and energy storage means (511) for utilizing at least solar energy and wind energy, a plurality of sensors (508, 514) for detecting predetermined environmental parameters and a communications system (509, 515) for transmitting data from said sensors (508, 515) to and for receiving command signals from one or more remote stations and/or cooperating vehicles.

19 Claims, 7 Drawing Sheets

U.S. PATENT DOCUMENTS

| | | | |
|---|---|---|---|
| 4,159,427 A | | 6/1979 | Weidmann |
| 4,371,347 A | | 2/1983 | Einar |
| 5,236,378 A | | 8/1993 | Newman |
| 5,291,847 A | | 3/1994 | Webb |
| 5,449,307 A | | 9/1995 | Fuereder |
| 5,687,137 A | * | 11/1997 | Schmidt et al. ............. 367/131 |
| 5,713,293 A | | 2/1998 | Shiffler et al. |
| 5,863,228 A | | 1/1999 | Tether |
| 5,894,450 A | * | 4/1999 | Schmidt et al. ............. 367/134 |
| 5,995,882 A | * | 11/1999 | Patterson et al. ............. 701/21 |
| 6,273,015 B1 | * | 8/2001 | Motsenbocker et al. .. 114/61.12 |
| 6,536,272 B1 | * | 3/2003 | Houston et al. .......... 73/170.29 |
| 6,807,921 B2 | * | 10/2004 | Huntsman ................... 114/312 |
| 6,854,406 B2 | * | 2/2005 | Cardoza et al. ....... 114/144 RE |
| 7,290,496 B2 | * | 11/2007 | Asfar et al. ................. 114/312 |

FOREIGN PATENT DOCUMENTS

| | | |
|---|---|---|
| CA | 2245286 | 3/2000 |
| CA | 2342378 | 9/2002 |
| DE | 3303535 | 8/1984 |
| DE | 4304688 | 7/1994 |
| DE | 10215634 | 10/2003 |
| EP | 252733 | 1/1988 |
| EP | 903288 A2 | 3/1999 |
| FR | 2825082 | 11/2002 |
| GB | 2326143 | 12/1998 |
| JP | 2002136776 A | 5/2002 |
| JP | 2003072675 A * | 3/2003 |
| WO | WO 01/70568 A1 | 9/2001 |

OTHER PUBLICATIONS

US Naval-Industry R&D Partnership Conference, Spartan "Scout", Aug. 13, 2002.

International Search Report, Australian Patent Office, Serial No. 2003903968, Apr. 20, 2004.

Derwent Abrstrac,t Accession No. 2003-436865/41, Class D15, KR 2003006640A, Bang, Jan. 23, 2003.

Derwent Abstract Accession No. 2001-280309/29, Class Q24, RU 2163556 C1, Utyakov, Feb. 27, 2001.

Derwent Abstract Accession No. 2004-054043/06, Class P62, CN 1439491 A, Univ. Bejing Aerospace, Sep. 3, 2003.

First Examination Report; Indian Patent Application No. 32/MUMNO/2006; Jan. 13, 2009; 2 pages.

Supplemental European Search Report; Application No./Patent No. 04737632.2-1254/1651512 PCT/AU2004001014; Apr. 7, 2009; 3 pages.

Office Action (in Chinese); 5 pages; issue date Sep. 28, 2007.

English translation of China Office Action issued Sep. 28, 2007; 3 pages.

Translation of Japanese Office Action; Application No. 2006-521348; dated Feb. 19, 2010; 4 pages.

Translation of Japanese Patent Abstract and Figures; Observation Ship; Publication No. 11-034973; Publication Date Feb. 9, 1999; 6 pages.

Translation of Japanese Patent Abstract; Vessel with Stationary Point Retaining Specification; Publication No. 2001-080573; Publication Date Mar. 27, 2001; 1 page.

Translation of Japanese Patent Abstract; Submerging and Surfacing Propulsion System for Glider Type Submarine Boat; Publication No. 62-023894; Publication Date Jan. 31, 1987; 1 page.

Translation of Japanese Patent Abstract and Figures, Patent No. 3050016; A Wing Sail Covered with Solar Cells; 6 pages.

Translation of Japanese Patent Abstract; Hydrogen Recovery System Provided with Hydrogen Manufacturing Plant; Publication No. 2003-072675; Date of publication Mar. 12, 2003; 1 page.

Translation of Japanese Patent Abstract; Hybrid Type Electric Power Supply Facility; Publication No. 10-144327; Publication Date May 29, 1998; 1 page.

* cited by examiner

UNMANNED OCEAN VEHICLE

This application claims the benefit of the filing of International Application No. PCT/AU2004/001014, filed Jul. 30, 2004; which in turn claims the benefit of Australian Patent Application Nos. 2003903968 filed Jul. 31, 2003 and 2004902116 filed Apr. 21, 2004.

BACKGROUND OF THE INVENTION

1. Field of the Invention

The present invention relates to unmanned, autonomous, waterborne vehicles for marine use, herein referred to as unmanned ocean vehicles (UOVs). In particular, although not exclusively, the invention relates to unmanned ocean vehicles utilising renewable energy sources which enable extended periods of operation, such as in remote ocean surface surveillance.

2. Discussion of the Background Art

The military, governmental and commercial uses for UOVs in warfare, exploration, research and monitoring applications at sea are numerous. The ability of conventional platforms, such as ships and buoys, to gather data and information in these applications is limited, particularly when compared to the vastness of the world's oceans. Ships are expensive to build, man, and operate. Buoys, either fixed or floating, generally provide only pinpoint coverage. Whilst some additional data may now be gathered remotely by satellites, they are more expensive and their sensors can provide very limited ocean data.

The sensors and instruments available to gather oceanographic data and information directly are well developed. It is clear that modern communications and information technology may be used to fully exploit extended networks of instruments and sensors, such as described in U.S. Pat. No. 5,894,450 to Schmidt et al. However, a desirable element is an inexpensive, mobile, and self-sustaining platform that could provide power and connectivity for ocean surveillance, communications, research and other applications requiring endurance.

Conventional unmanned surface vehicles, such as described in U.S. Pat. No. 5,713,293 to Shiffler et al. or the Spartan "scout" vehicle proposed by the US Naval Undersea Warfare Centre of Newport, R.I., USA, typically employ conventional fossil fuelled power units that provide limited range and endurance. Conventional unmanned surface vehicles, at least when operating in a semi-autonomous mode, are also subject to the threat posed by collision or close encounters with larger vessels.

SUMMARY OF THE INVENTION

Object of the Invention

It is an object of the invention to provide a UOV for marine use which addresses the drawbacks of prior art unmanned surface vehicles proposed for warfare, exploration, research and monitoring applications at sea, desirably for extended periods and/or over longer operating ranges.

Disclosure of the Invention

The use of solar energy to supplement conventional energy sources, such as fossil fuels or wind energy, for marine vessels has been demonstrated by the present applicant in International Patent Publication No. WO 98/21089, which describes wing sails which include solar collectors. It has now been realised that hybrid propulsion systems, such as wing sails with solar collectors, can provide a source of energy for unmanned surface vehicles, thereby providing enhanced operating range. A wing sail of this type may be pivotally mounted to a hull or body of the UOV whereby when erected can sail under wind power and, if angled optimally to sun, also collect solar energy. Alternatively the wing sail may be declined along length of the UOV hull to reduce the UOV's drag in undesirable wind conditions and its silhouette whilst continuing to collect solar energy.

In one broad aspect, the invention resides in a UOV for operating either on or below the surface of a body of water, said vehicle including:

an enclosed hull having a payload bay;

a hybrid propulsion system having energy collection means and energy storage means adapted for utilising at least solar energy and wind energy;

a plurality of sensors for detecting predetermined environmental parameters; and a communications system for transmitting data from said sensors about selected environmental parameters to, and for receiving command signals from, one or more remote stations and/or cooperating UOVs.

The outer configuration of the hull or body of the UOV suitably has the general appearance of an aquatic animal, such as a fish, dolphin, whale, tortoise, squid, octopus or other suitable aquatic animal.

Preferably, the enclosed hull is adapted to facilitate selective operation at or below the water surface. Suitably the hull may include ballast tanks for selective submerging and surfacing of the UOV.

Most preferably the hybrid propulsion system includes a wing sail having an aerofoil configuration for propelling the vehicle using wind energy and having solar energy collectors, such as photovoltaic cells, disposed on the surface of the wing sail. Preferably the wing sail may be lowered to a declined position along the body of UOV to reduce drag whilst continuing to collect solar energy.

The energy storage means of the hybrid propulsion system suitably includes electrical storage cells, such as batteries or capacitors, coupled to the solar energy collectors. The hybrid propulsion system may further include an electrical machine mechanically coupled to a fluid drive element such as a propeller, jet, or oscillating tail member.

The electrical machine may be supplied from the storage cells to drive the element in a motor mode or, in the alternative, the electrical machine may be driven by the drive element through wave action, water currents or during regenerative sailing to charge the storage cells in a generator mode. The capacitors or other rapid energy discharge devices, such as fluid accumulators, may provide the UOV with a short sprint capability.

The payload bay is preferably internally powered in order to carry devices including sensors for oceanographic or military use, live-saving or fire-fighting equipment for search and rescue, and weapons relating to desired UOV operations. The environmental sensors may include an anemometer, a wind vane, radar, an optical band sensor, an infrared band sensor, a chemical and/or biological sensor, an acoustic sensor, and a bathymetric sensor.

The communications system may include a GPS receiver, a LFB/SWB/marine band receiver, satellite receivers, together with suitable antenna arrays for each, including antennae arrays which may be reeled in and out of the vehicle and towed for operation.

Most suitably the UOV is able to dive under the surface for prolonged periods using stored energy to avoid ship, storms or for stealth operations. If required, the hybrid propulsion system may further include a fuel cell for emergency use, such as emptying ballast tanks to surface after a prolonged period of submerged operation.

In other modes of operation, the UOVs will deploy and utilize command and control relay centres, commanding individual UOVs or operating in groups of, for example up to 1,000 or more. The UOVs may operate via remote control systems, for example space-borne systems (eg. satellites) or airborne intelligence systems (e.g. planes or balloons), or jointly with military long range radio transmission systems such as Very Low Frequency (VLF) or Extremely Low Frequency (ELF) transmissions. If required, the UOVs may utilise a relay type communication system using communications channels provided between individual UOVs in the group, thereby relaying messages via a chain of command back to a command centre on a ship or at a land base.

BRIEF DETAILS OF THE DRAWINGS

In order that this invention may be more readily understood and put into practical effect, reference will now be made to the accompanying drawings that illustrate preferred embodiments of the invention, and wherein.

DESCRIPTION OF EMBODIMENTS OF THE INVENTION

Figure 1:
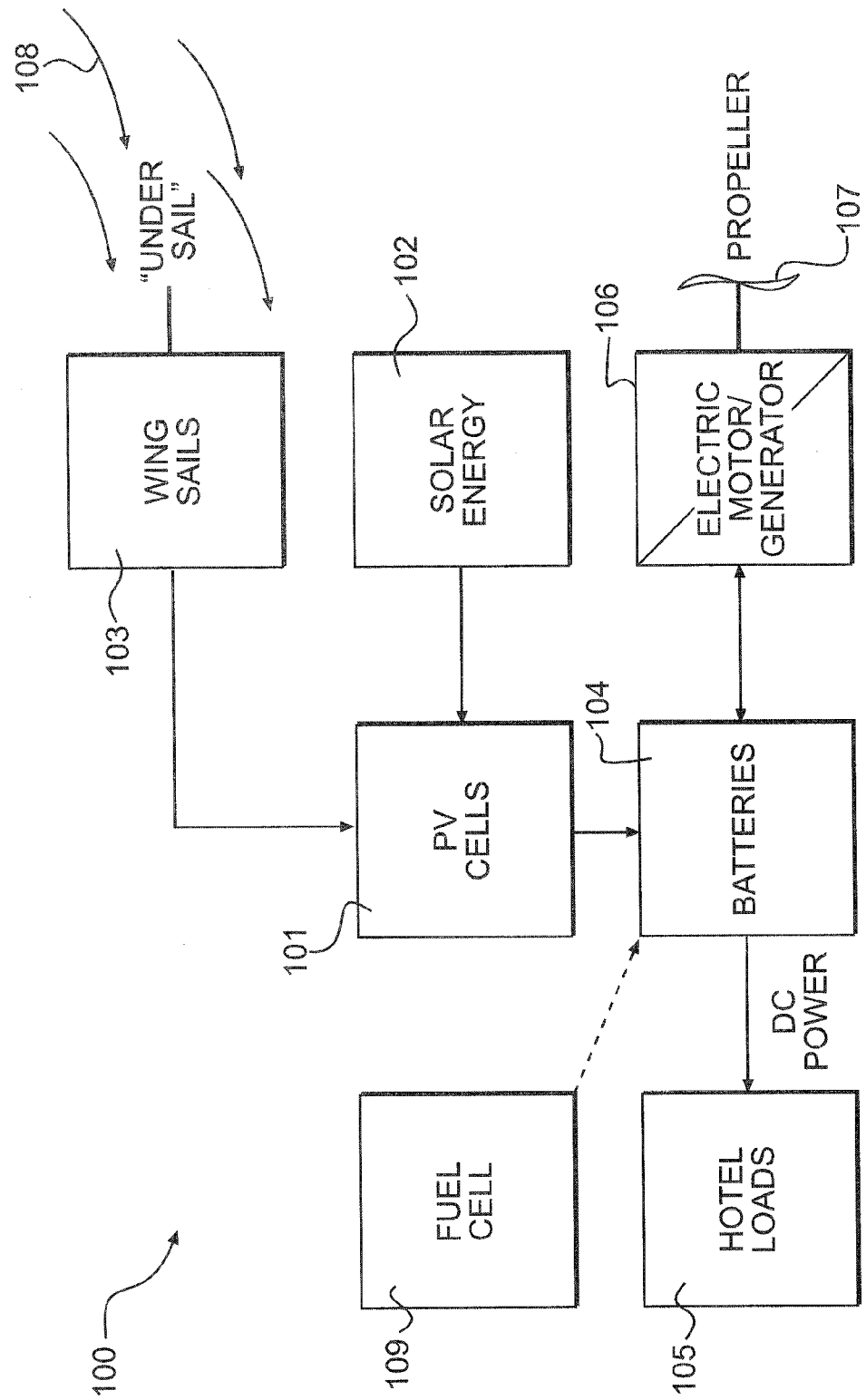
FIG. 1 is an overview diagram of a hybrid propulsion system suitable for first embodiment and second embodiments of the invention.

A hybrid propulsion system 100 for embodiments of UOV of the invention is depicted in FIG. 1. The propulsion system includes arrays of photovoltaic cells 101, which may be mounted on or integral with surfaces of the vehicle that are able to collect solar energy 102. These collection surfaces include surfaces 103 of wing sails (not shown) which can be selectively positioned for collecting solar energy, as will be described below. The photovoltaic cells 101 supply electrical energy to storage cells, such as batteries 104. The batteries in turn supply DC power for hotel loads 105 of the vehicle and also to an electric motor/generator 106 which drives a propeller 107 in the "motor" mode.

When the wing sails which are fixed to the vehicle are erected they can propel the vehicle using the available wind energy, putting the vehicle "under sail" 108. The propeller 106 may also be configured to collect energy from the flow of water relative to the vehicle, i.e. passing current or regenerative sailing, and thereby assist re-charging the batteries by driving the electric motor/generator in the "generator" mode. A further option for re-charging the batteries or providing emergency stand-by power when environmental conditions are unsatisfactory is through use of an auxiliary fuel cell 109.

Figure 2:
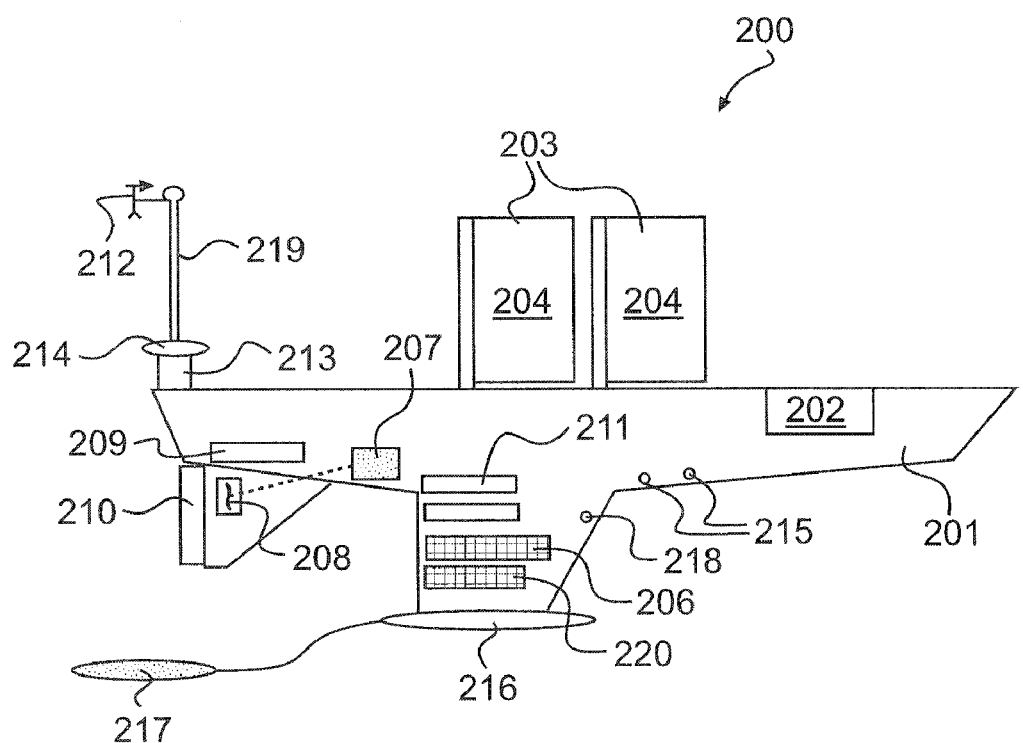
FIG. 2 is a side elevation view representing a UOV of a first embodiment suited to low cost construction.
Figure 3:
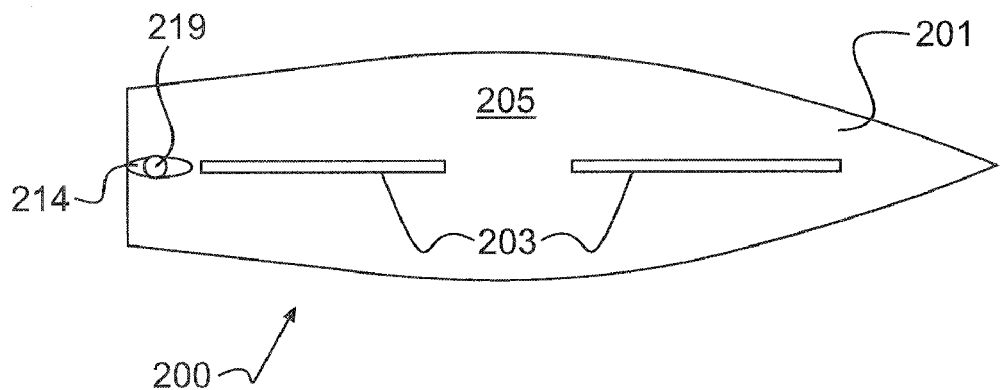
FIG. 3 is a top plan view representing a UOV of the first embodiment.

Turning to FIGS. 2 and 3 there is represented a UOV 200 of a first embodiment of the invention which is able to be constructed at relatively low cost. The vehicle includes an enclosed hull 201 constructed of fiberglass material, having a length of 3 to 15 meters (10-50 feet), a beam of about 1 to 10 meters (3-35 feet) and weighing in the region of 100 to 8000 kg (220 to 17600 pounds). The hull encloses a payload compartment 202 for a payload weighing in the region of 50 to 500 kg (110 to 11000 pounds). Hull extensions including a keel and a rudder (not shown) are retractable to facilitate storage and handling.

The UOV includes a hybrid propulsion system having two retracting wing sails 203 are attached to the hull 201 for collecting wind energy to propel the vehicle. Both the surface of the sails 204 and the upper surface of the hull or deck 205 include sections covered with photovoltaic cells. The photovoltaic cells convert ambient solar energy into electrical energy for supply to a battery bank 206. The battery bank is in turn electrically coupled to an electrical machine 207 which is mechanically coupled to a propeller 208. A control module 209 is coupled to each of these components of the hybrid propulsion system and also to a rudder 210, to guide the vehicle and optimize the use of available solar energy and wind energy, in order to propel the vehicle along a desired course. The control module 209 includes a guidance system having a global positioning system receiver with automatic sequencing, tracking and storage capabilities.

The payload compartment accommodates electronic systems 211 supporting environmental monitoring and data logging equipment, including an anemometer/wind vane 212, radar 213, and optical and infrared band sensors 214, hull-mounted chemical/biological sensors 215, acoustic sensors, both fixed 216 and optionally deployable 217, and a bathymetric sensor 218. Suitable antenna arrays 219 are also provided for the GPS receiver and communications purposes.

Utilising a wind and solar electric propulsion system 100 of the type described in relation to FIG. 1, it is anticipated that the vehicle could reach a hull speed of about 4 to 8 knots when sailing in around 15 knot winds. In the solar powered operating mode, the vehicle could maintain about 2 to 4 knots for a minimum 24 hour period. It is estimated that the power required for the payload will be in the order of 0.5 to 1.2 kW, and that standby power of 10 to 40 kW could be provided by an optional fuel cell 220.

Figure 5:
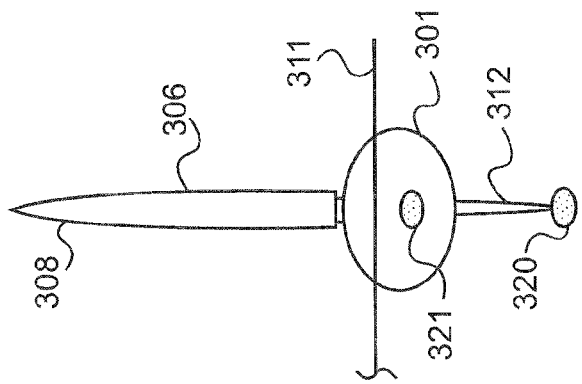
FIG. 5 is a front elevation view representing the UOV of the second embodiment.
Figure 4:
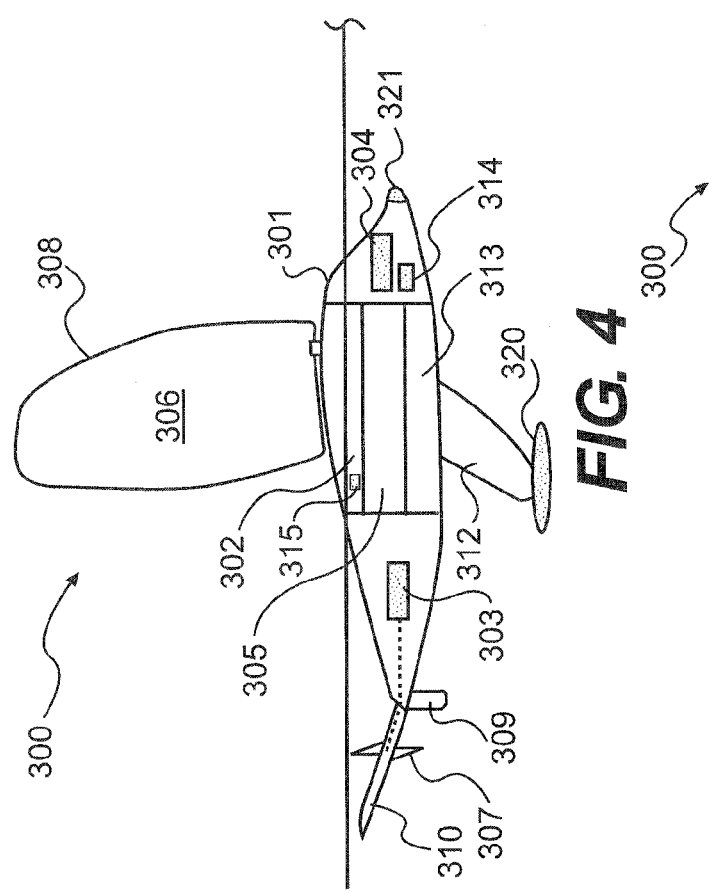
FIG. 4 is a side elevation view representing a UOV of a second embodiment of the invention suited to stealth operations.
Figure 6:
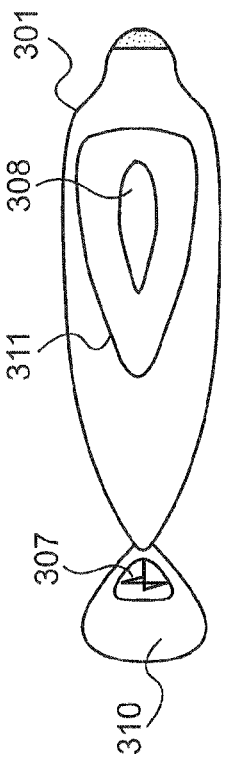
FIG. 6 is a top plan view representing a UOV of the second embodiment.

In FIGS. 4 to 6 there is depicted a UOV 300 of a second embodiment of the invention suited to stealth, surveillance and additional roles requiring submersible or submerged vehicle operation. The enclosed hull 301 is constructed of a carbon fibre composite material and has the general appearance of an aquatic animal, here a dolphin or porpoise. Accordingly the hull has a length of 1 to 10 meters (3-30 feet), a width of about 0.1 to 3 meters (0.5-9 feet) and a weight of 50 to 500 kg (110 to 1100 pounds). The enclosed hull 301 includes in internal payload bay 302 for accommodating a payload weight of 10 to 100 kg (22 to 220 pounds).

The UOV includes a hybrid propulsion system including an electric motor 303, a fuel cell 304, electrical storage cells such as a battery bank 305 and a photovoltaic array 306 for collecting solar energy. The PV array 306 is provided on the surface of a wing sail 308 which is attached to the hull 301. It is anticipated that a 1 m$^2$ wing sail operating in a 18 knot trade wind would provide about 50 watts and drive the vehicle at 3-4 knots.

Utilising solar energy, it is anticipated that the photovoltaic array 306 could generate 1.2 kW per day which would supply the electric motor 303 to drive a propeller 307, delivering a vehicle average speed of 2-3 knots. The electric motor 303 could be overrated for short periods to give 20 knot+sprint speed in short bursts. The battery bank 305, the fuel cell 304 and a rapid discharge device 314 (such as a capacitor bank or fluid accumulator can provide auxiliary/standby power as required. Such use includes emergency emptying ballast tanks 313 to surface the vehicle after a prolonged period of submerged operation. A rudder 309 and elevator 310 combination is provided to assist in guiding the vehicle under control of a guidance system.

The UOV is arranged to operate in a semi-submerged position relative to 20 the waterline 311 as depicted in the drawings, with the wing sail 308 erected above the waterline to collect ambient solar energy and propel the vehicle. The UOV 300 further includes a guidance system 315 having a GPS receiver remote with automatic sequencing, and tracking storage. Sensors for atmospheric data, for intercepting radio .frequency emissions, and other sensors are integrated into 25 the wing sail assembly, whilst a sonar 320 and other oceanographic sensors 321 are integrated into the hull 301 or keel 312.

Figure 7:
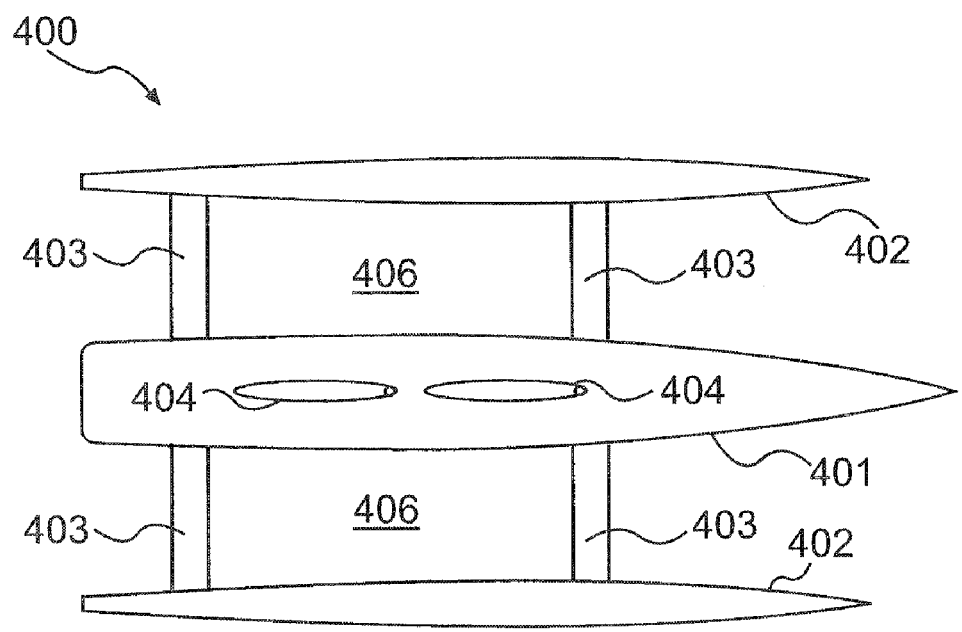
FIG. 7 is a top plan view representing a UOV of a third embodiment of the invention, suited to high load capacity operations.
Figure 8:
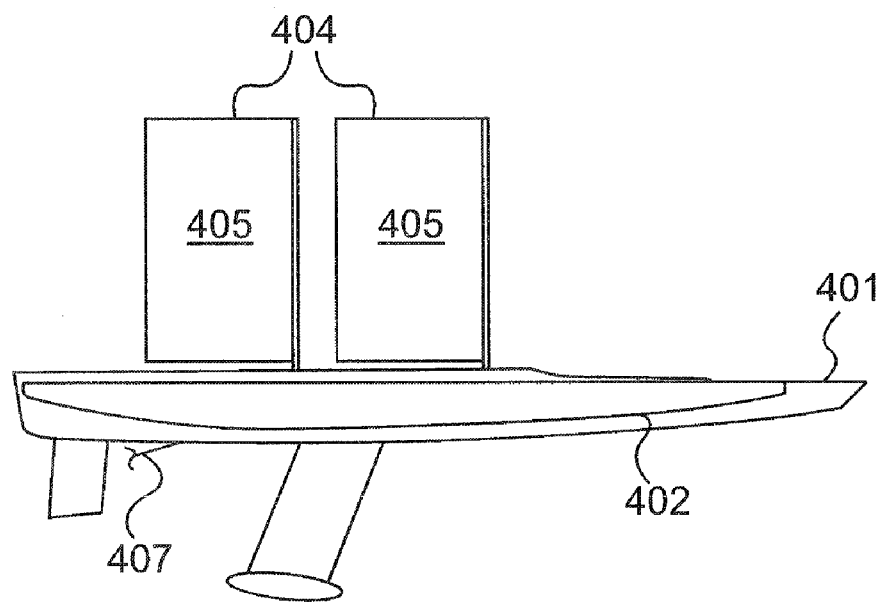
FIG. 8 is a side elevation view of the UOV of the third embodiment.

Turning to FIGS. 7 and 8, there is depicted a UOV 400 of a third embodiment of the invention which is suited to higher speed delivery of a larger capacity payload. The vehicle has a hull assembly, which includes a central hull 401 and two floats 402 with respective outriggers 403, constructed of a composite material having an overall length of 8 to 20 meters (25-65 feet), a beam of 6 to 16 meters (20 to 50 feet) and a weight of 400 to 8000 kg (880-17600 pounds). A pair of wing sails 404 having photovoltaic cells 405 disposed thereon is provided on the central hull 401 to capture both wind and solar energy. Each wing sail 404 is attached to the hull such that it may be declined along or laterally of the hull assembly when not required for wind propulsion purposes. The declined position of the wing sails reduces the silhouette of the vehicle whilst optionally allowing collection of solar energy. Further photovoltaic cells 406 are mounted between the outriggers 403 to enhance the surface area available for collection.

It is estimated that the payload, which includes equipments similar to those in the first embodiment, would require power of about 1 to 2 kW. A wind-solar hybrid propulsion system of the kind described in relation to FIG. 1 is provided. 10 The propulsion system is estimated to provide 10 to 15 knots with the wing sails erected before 15 to 25 knot winds, and the solar collection is estimated to deliver an average speed of 4 knots for minimum of 24 hours, using an electric motor driven propeller 407. The system could provide speeds up to 25 knots in higher wind speeds, and under power for several hours. The vehicle further includes a 15 guidance system, including a GPS receiver with automatic sequencing, and tracking storage.

Figure 10:
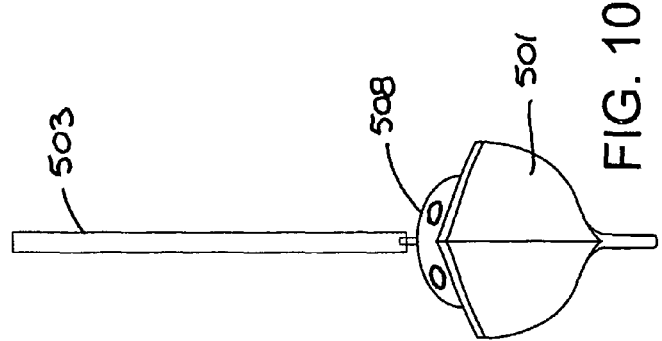
FIG. 10 is an end elevation view of the UOV of the fourth embodiment.
Figure 9:
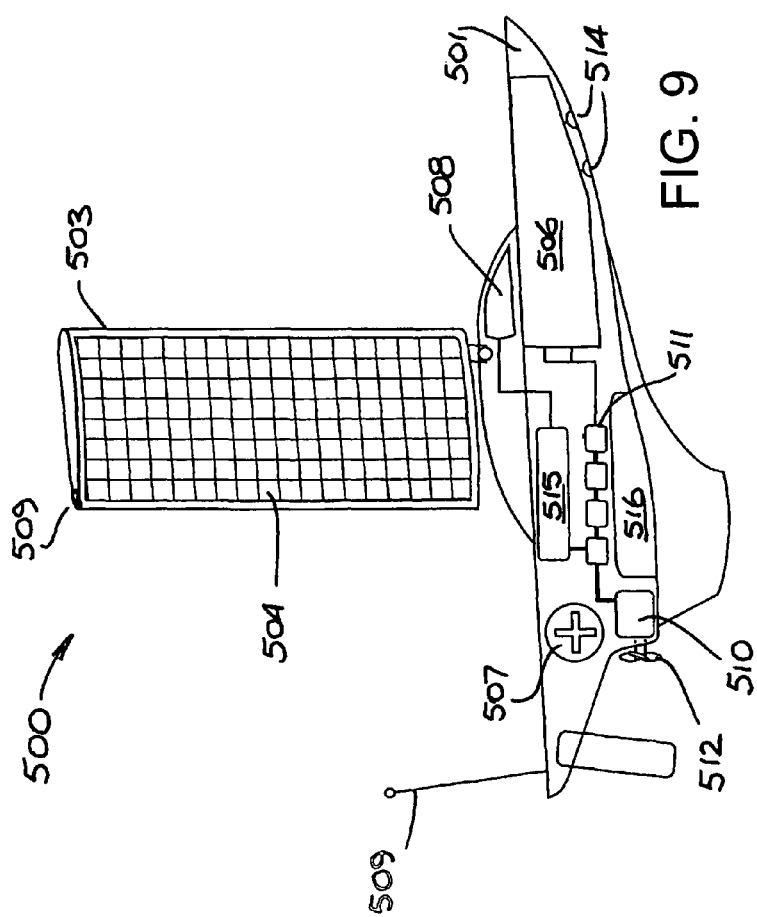
FIG. 9 is a sectional side elevation view of a UOV of a fourth embodiment of the invention suited to search and rescue operations.
Figure 11:
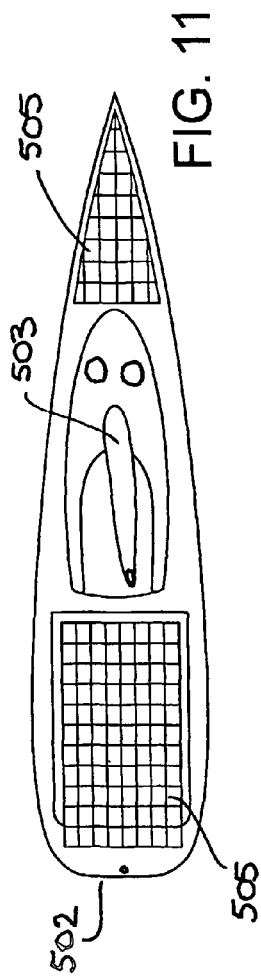
FIG. 11 is a top plan view of the UOV of the fourth embodiment.
Figure 12:
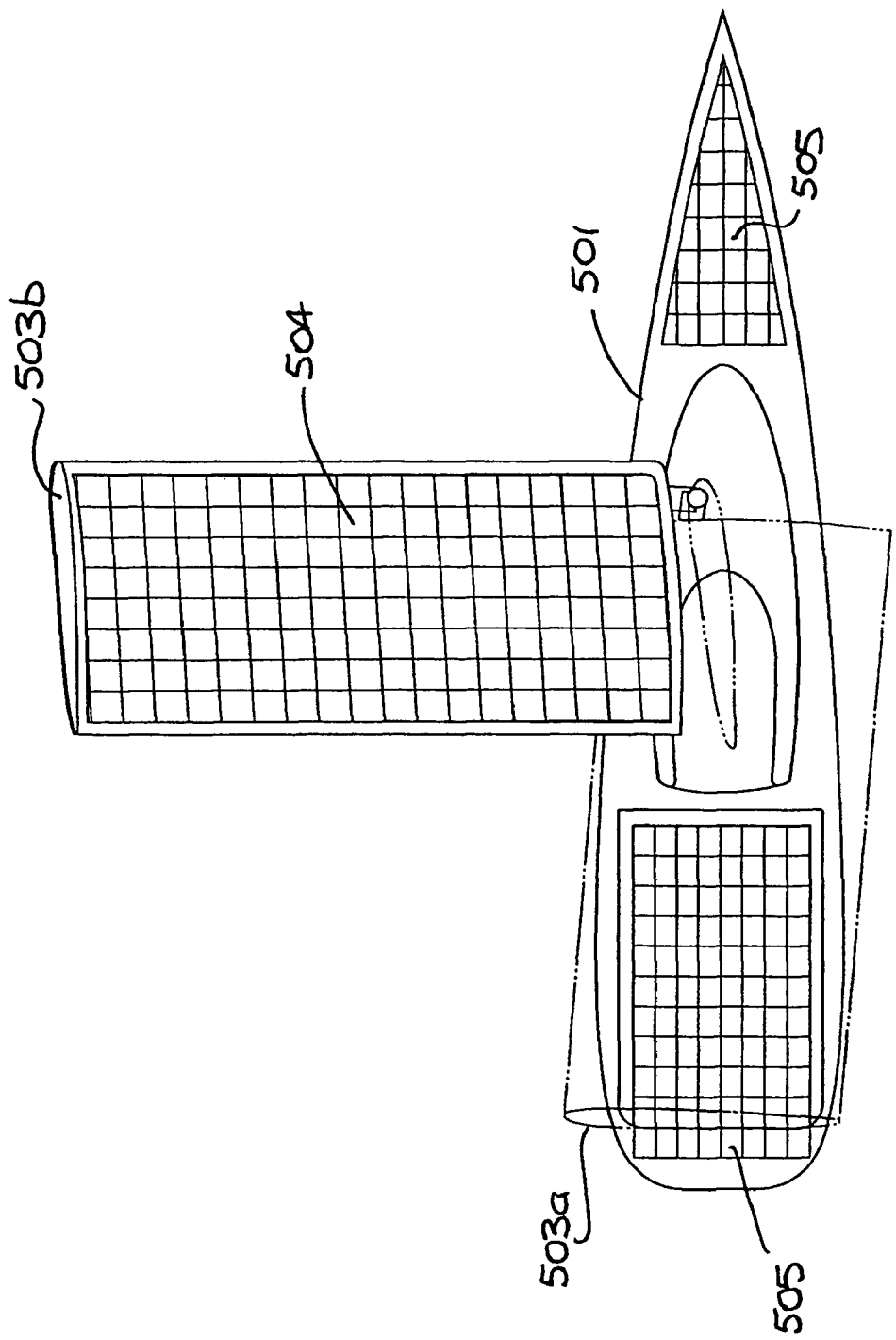
FIG. 12 is a further top plan view of the UOV of the fourth embodiment showing alternative configurations of the wing sail.

A UOV 500 of a fourth embodiment of the invention is depicted in FIGS. 9 to 11. The vehicle includes an enclosed hull 501 that is about 4 meters (12 feet) long and 1 meter (3 feet) wide at widest near the stern 502 on surface. The vehicle includes a single wing sail 503 attached to the hull 501 such that it may be erected or declined, either along 503a the hull (as shown in phantom in FIG. 12) or laterally 503b of the hull (as shown in FIG. 12). The surface of the wing sail is covered on at least one side with photovoltaic cells 504 for collecting solar energy. A lateral declination of the wing sail 503 provides the vehicle with a reduced silhouette, whilst allowing solar energy collection from both cells 504 disposed on the wing sail and further photovoltaic cells 505 provided on upper surface or deck portions of the hull, both fore and aft of the wing sail.

An internally powered payload bay 506 is provided in the forward portion of the hull 501, whilst an aft compartment contains a deployable life raft of conventional construction. The life raft is deployed by pressing a panel 507, identified on the side of the hull with a red cross, or via other remote means (not shown). The vehicle is provided for search and rescue use in circumstances of a person overboard or aircraft ditching. A hand-rail may be provided on the deck to assist persons in the water. An alternative embodiment for remote fire fighting use or hazardous material spill response, the vehicle may include fire-fighting equipment.

Optical, infrared and other sensors 508 provided in a forward housing sitting proud of the deck assist in locating people when operated in search mode. When these and other environmental sensors 514 are linked to a navigation control system in this way, the vehicle operates as an intelligent life preserver which can be deployed from a larger ship to find and stay with the victim in the "man overboard" situation. This intelligent robotic performance can be coupled with an active GPS location system, perhaps on the life preserver of the victim, to guide the UOV to the GPS location of the victim's transmission device.

The vehicle 500 includes a control module 515 providing robot intelligence for executing a pre-programmed mission. This allows the UOV to avoid ships, conduct a 'man overboard' rescue mission and optimise energies, e.g. sail in a circle to get to a point by following currents, use a burst mode communications sub-system to report unusual activity and the like. Various aerial arrays 509 for communications purposes may be integrated into the wing sail or mounted on the stern, as shown in FIG. 9. The communications system may include a GPS (Global Positioning System) receiver together with transceivers for all forms of analog and digital communication, including radio, radiotelephone and/or cellular mobile communications.

The vehicle includes a hybrid propulsion system of the general type discussed in relation to FIG. 1. The system includes an electric motor 510 supplied by a battery bank 511 and mechanically driving a propeller 512. The electric motor is considered to require 40 watts to drive the propeller to achieve a typical cruising speed of 3 knots. A ballast tank 516 is provided for added stability. It will be appreciated that the cruising speed is limited to renewable energy plus any available stored energy.

The control module of the embodiment further includes a power management system to supply around 40-200 W continuously for electronics supporting control, surveillance and communications requirements. It is estimated that when operating on solar power alone, the vehicle will be capable of 54 hours of operation and an associated cruise range of approximately 160 nautical miles. In favourable weather conditions, where both sunshine and wind is available, the UOV has an almost an indefinite energy supply at loiter speeds.

Figure 13:
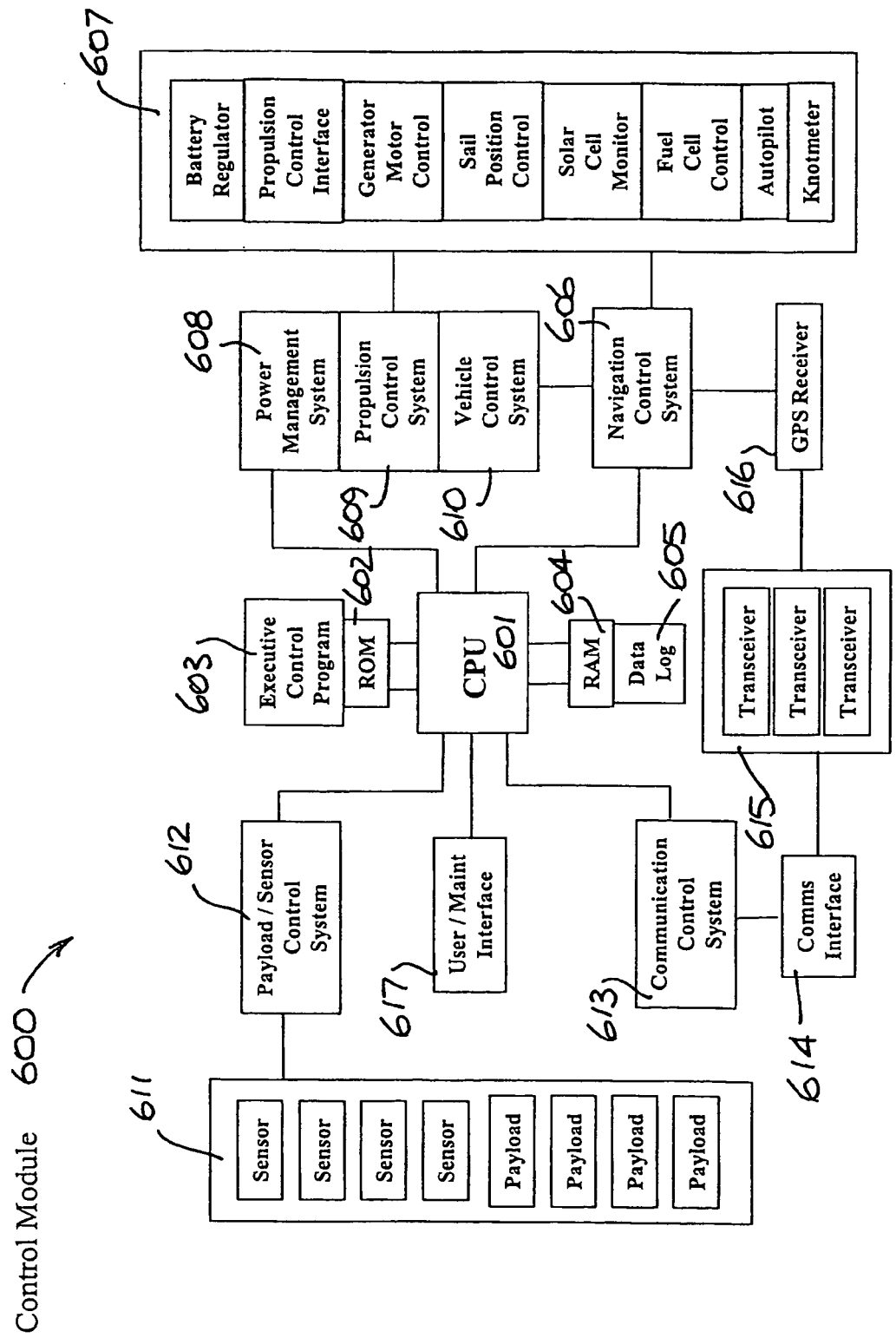
FIG. 13 is a schematic block diagram of a command and control module for UOVs of the embodiments.

A command, control and communication system 600 suitable for any embodiment of the vehicle, is depicted in FIG. 13. The system includes a processing unit or CPU 601 connected to a read only memory ROM 602 having an executive control program 603 and connected to a random access memory RAM 604 having a data log area 605. The computer based system 600 controls all aspects of the vehicle, including steering and navigation by a navigation control system 606, management of power consumption and distribution by a power management system 608, management of propulsion systems 607 by a propulsion control system 609, voyage planning and execution by a vehicle control system 610, control and data collection of various and varied payloads and sensors 611 (as described above) by a payload/sensor control system 612. A communication control system 613 is provided with a communications interface 614 to various communications transceivers 615 (as described above). The navigation control system 606 is also coupled to a global positioning system (GPS) receiver 616 to determine vehicle position.

A user interface 617 is provided for maintenance and/or updating of the control module, as required. The executive control program 603 is arranged for coordinating the activities of the subsidiary systems in order to follow a mission plan, maintaining situational awareness, executing manoeuvres for collision avoidance, vehicle protection in event of severe weather, accidents, or human interference, communication of sensor collected data and information, and communication to and from the vehicle for vehicle status reporting and remote control or re-assignment.

In considering operation of a hybrid propulsion system which is characterised by the use of renewable energy, i.e. non-terrestrial, non-fossil fuel powered, the system may be operated in a number different modes, including:

1. Wind energy only (direct sailing);
2. Wind energy with electrical re-generation ('regenerative sailing'), i.e. wind-propelled vehicle motion providing hydrodynamic energy to spin the propeller, driving the motor to generate electrical power;
3. Wave energy (when loitering at a predetermined location); and
4. Solar energy, alone or in combination with 1-3 above.

Other proposed renewable energy sources include the use of temperature differential, ocean current, salinity (using sea water as part of a battery or fuel cell), magnetism, ions, laser recharging from mirrors on satellites, and other renewable energy sources allowing the vehicle to stay at sea substantially indefinitely without a terrestrial source of power. A network of UOVs may be arranged in a variety of patterns of coverage, including scouts, swarms, hives, schools, lines, grids, random networks, perimeters, Chi patterns, etc.

INDUSTRIAL APPLICATION

A UOV constructed in accordance with a preferred embodiment of the invention, utilizing off-the-shelf sensors and instruments, could do the work now done by (relatively few) manned ships but at a greatly reduced cost. The UOV would complement advances that have already been made in satellite and airborne imaging and sensing. The UOV also provides a mobile and self-powered platform that would provide the dwell time required for warfare, exploration, and research and monitoring in-situ. The UOVs will be able to go to sea for extended periods of up to years without refuelling or maintenance, using renewable energy such as solar and wind.

The UOV of the invention may be configured for a number of functions, including:
  Long term patrol;
  Geo-stationary buoy function;
  Interception of targets;
  Clandestine/stealth operations;
  Intelligence gathering;
  Sensing of water and air, for pollution, smugglers illegal operations;
  Interception of electromagnetic transmissions;
  Detection;
  Surveillance;
  Mine warfare (neutralisation or deployment of mines)
  Protection of ships when docked in a harbour from attack;
  Sea rescue and retrieval;
  Underwater retrieval; and
  Underwater surveillance.

It is to be understood that the above embodiments have been provided only by way of exemplification of this invention, and that further modifications and improvements thereto, as would be apparent to persons skilled in the relevant art, are deemed to fall within the broad scope and ambit of the present invention defined in the claims which follow.

The invention claimed is:

1. An unmanned ocean vehicle for operating either on or below the surface of a body of water, said vehicle comprising:
    an enclosed hull having a payload bay;
    a hybrid propulsion system having energy collectors and energy stores utilising at least (i) solar energy, (ii) wave or water current energy, and (iii) wind energy;
    a plurality of sensors for detecting predetermined environmental parameters; and
    a communications system for transmitting data from said sensors about selected environmental parameters to, and for receiving command signals from, one or more remote stations;
    wherein the hybrid propulsion system includes an electrical machine mechanically coupled to a fluid drive element, and wherein the electrical machine is supplied from the energy stores to drive the fluid drive element in a motor mode, and wherein the vehicle further includes ballast tanks for selective submerging and re-surfacing of the vehicle to facilitate selective operation on or below the water surface.

2. The unmanned ocean vehicle of claim 1 wherein the hull has an outer configuration having the general appearance of an aquatic animal.

3. The unmanned ocean vehicle of claim 1 wherein the hybrid propulsion system includes a wing sail having an aerofoil configuration for propelling the vehicle using wind energy and having solar energy collectors disposed on the surface of the wing sail.

4. The unmanned ocean vehicle of claim 3 wherein the wing sail may be lowered to a declined position along the hull of the vehicle to reduce drag whilst continuing to collect solar energy.

5. The unmanned ocean vehicle of claim 1 wherein the energy stores includes electrical storage cells coupled to solar energy collectors.

6. The unmanned ocean vehicle of claim 1 wherein the energy stores include rapid energy discharge devices to provide the vehicle with a short sprint capability.

7. The unmanned ocean vehicle of claim 6 wherein the rapid energy discharge devices comprise electrical capacitors.

8. The unmanned ocean vehicle of claim 6 wherein the rapid energy discharge devices comprise fluid accumulators.

9. The unmanned ocean vehicle of claim 1 wherein the payload bay is internally powered in order to carry electronic equipment supporting the environmental sensors for oceanographic or military use.

10. The unmanned ocean vehicle of claim 1 wherein the environmental sensors include sensors selected from the group including: anemometers, wind vanes, radars, radio frequency interceptors, optical band sensors, infrared band sensors, chemical/biological sensors, ocean current sensors, acoustic sensors, and bathymetric sensors.

11. The unmanned ocean vehicle of claim 1 wherein the communications system comprises a global positioning system (GPS) receiver, a LFB/SWB/marine band transceiver, a wide band transceiver, and a satellite transceiver, together with suitable antenna arrays.

12. The unmanned ocean vehicle of claim 11 wherein the antenna arrays include deployable antennae arrays, suited to towed operation when receiving signals ranging from extremely low frequency (ELF) band to super high frequency (SHF) band, capable of transmission and reception in these bands.

13. The unmanned ocean vehicle of claim 11 wherein the hybrid propulsion system includes a wing sail having an aerofoil configuration for propelling the vehicle using wind energy and having solar energy collectors disposed on the surface of the wing sail and wherein the antenna arrays are integrated into the wing sail or mounted on a stern portion of the enclosed hull.

14. The unmanned ocean vehicle of claim 1 wherein the vehicle is able to dive under the surface for prolonged periods using stored energy to avoid ships, storms or for stealth operations.

15. The unmanned ocean vehicle of claim 1 wherein the hybrid propulsion system further includes a fuel cell for emergency use.

16. The unmanned ocean vehicle of claim 1 wherein the hybrid energy propulsion system further utilises, in addition to wind energy, wave or water current energy, and solar energy, only renewable energy sources, including: temperature differential; and sea water activated batteries or fuel cells.

17. The unmanned ocean vehicle of claim 1 wherein the hybrid propulsion system includes an electrical machine coupled to a fluid drive element, wherein the electrical machine is driven by the drive element when the vehicle is propelled by wind acting on the hull and sails to charge the energy stores in a generator mode.

18. The unmanned ocean vehicle of claim 1 wherein the payload bay carries life-saving or fire-fighting equipment for search and rescue operations.

19. The unmanned ocean vehicle of claim 1 wherein the communications system is configured for transmitting and receiving command signals and data from one or more cooperating ocean vehicles.

* * * * *